(12) United States Patent
Launay et al.

(10) Patent No.: US 7,098,673 B2
(45) Date of Patent: Aug. 29, 2006

(54) CAPACITIVE MEASURING SYSTEM

(75) Inventors: Claude Launay, Champigny (FR); Pascal Jordana, La Queue-en-Brie (FR); Daniel Le Reste, Ferriere-en-Brie (FR); William Pancirol, Prunay-en-Yvelines (FR); Joaquim Da Silva, St Jean De Braye (FR); Philippe Parbaud, La Ferte Saint Aubin (FR)

(73) Assignee: Hitachi Computer Product (Europe) S.A.S., Olivet (FR)

( * ) Notice: Subject to any disclaimer, the term of this patent is extended or adjusted under 35 U.S.C. 154(b) by 0 days.

(21) Appl. No.: 10/482,611

(22) PCT Filed: Jun. 27, 2002

(86) PCT No.: PCT/FR02/02234

§ 371 (c)(1),
(2), (4) Date: Jul. 12, 2004

(87) PCT Pub. No.: WO03/002949

PCT Pub. Date: Jan. 9, 2003

(65) Prior Publication Data

US 2005/0068043 A1    Mar. 31, 2005

(30) Foreign Application Priority Data

Jun. 28, 2001  (FR) .................... 01 08529

(51) Int. Cl.
*G01R 27/26* (2006.01)
(52) U.S. Cl. ................ 324/658; 324/662; 324/690
(58) Field of Classification Search ............ 324/658, 324/662, 690
See application file for complete search history.

(56) References Cited

U.S. PATENT DOCUMENTS

| 4,451,780 A | * | 5/1984 | Ogasawara | ............. 324/671 |
| 6,545,603 B1 | * | 4/2003 | Launay et al. | .......... 340/540 |
| 6,637,276 B1 | * | 10/2003 | Adderton et al. | ....... 73/862.41 |

* cited by examiner

*Primary Examiner*—Walter Benson
(74) *Attorney, Agent, or Firm*—Blakely Sokoloff Taylor & Zafman

(57) ABSTRACT

The invention relates to a measuring device including at least one measuring probe, sequentially applying a controlled supply voltage between the measuring probe and a reference element, and integrating accumulated electric charges on the measuring probe. The device also includes at least one auxiliary measuring probe, which is also sequentially linked to a controlled electric supply and to charge integrating means. The auxiliary measuring probe has a capacity, in relation to a potential detection zone, which is different from the main measuring probe. Comparative use of signals respectively emitted by the two measuring probes enables the influence of the main measuring probe to be determined.

34 Claims, 6 Drawing Sheets

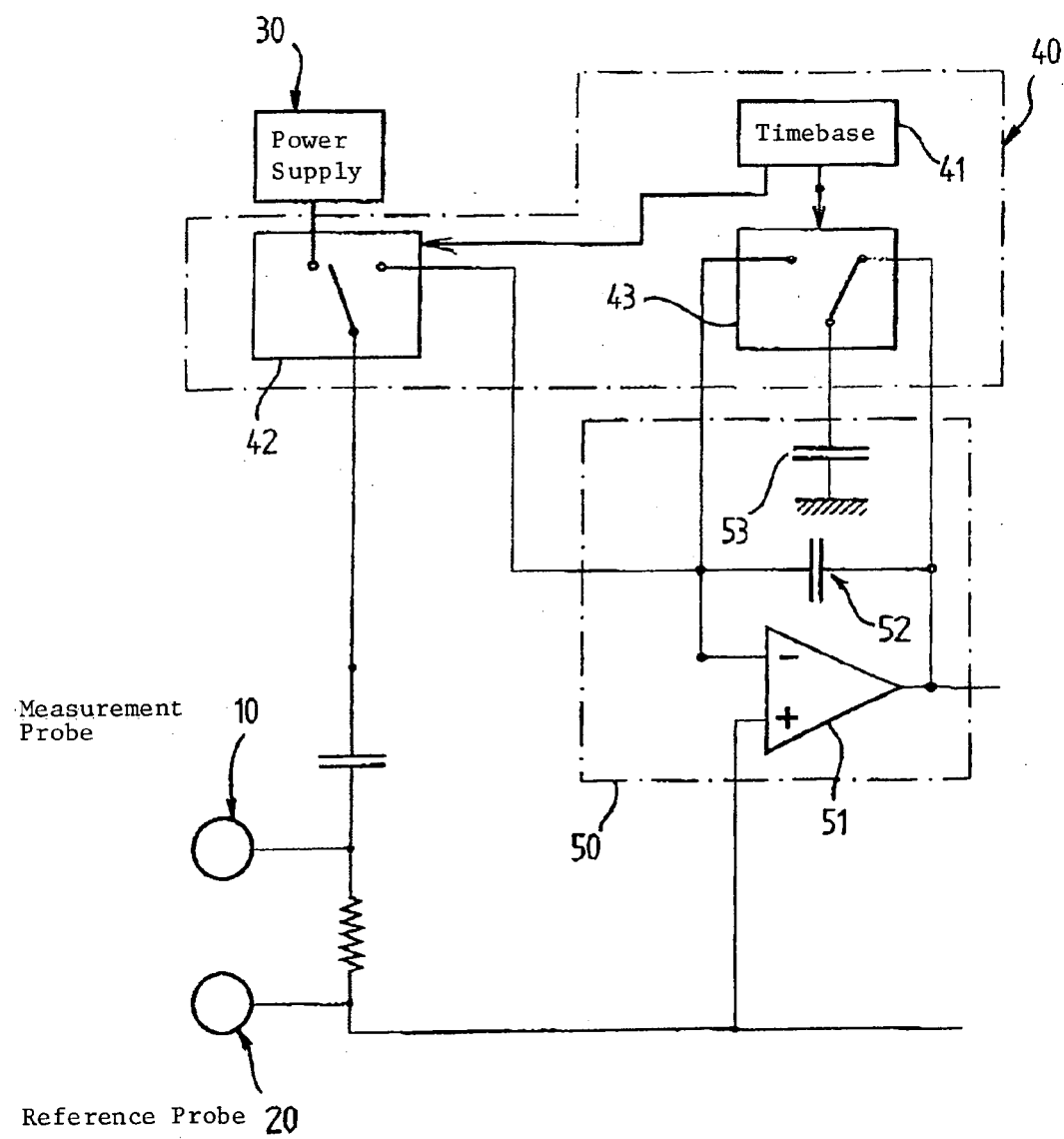

FIG_2
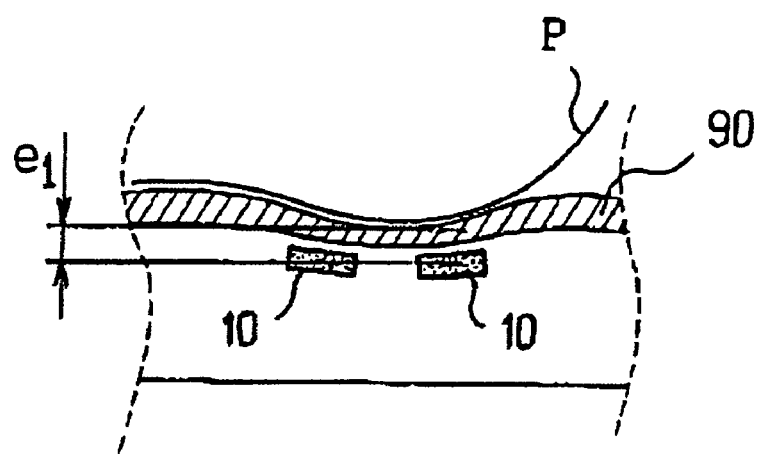
FIG_3
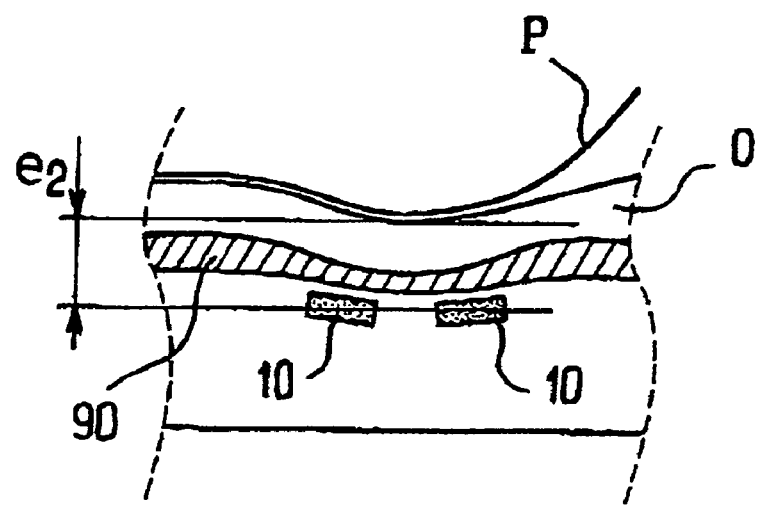

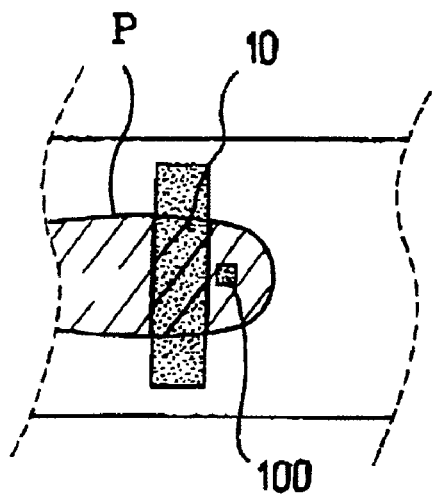
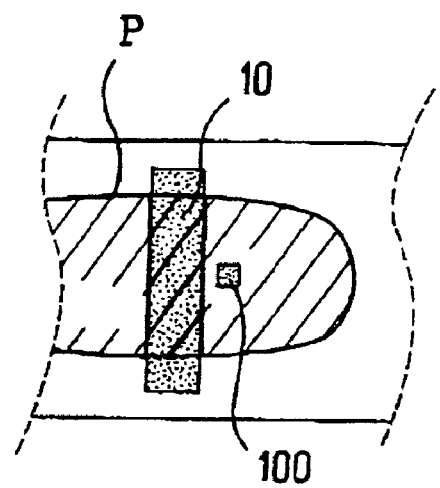
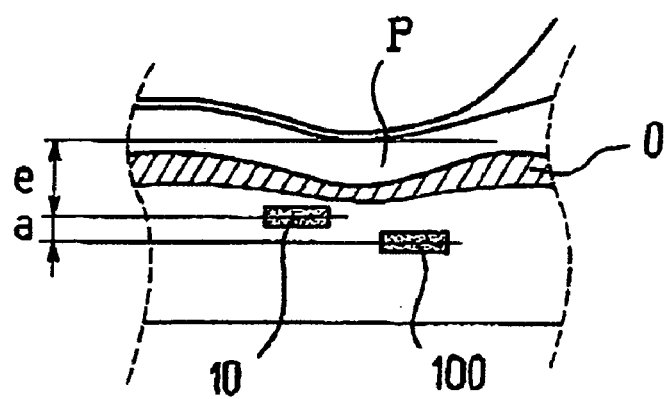

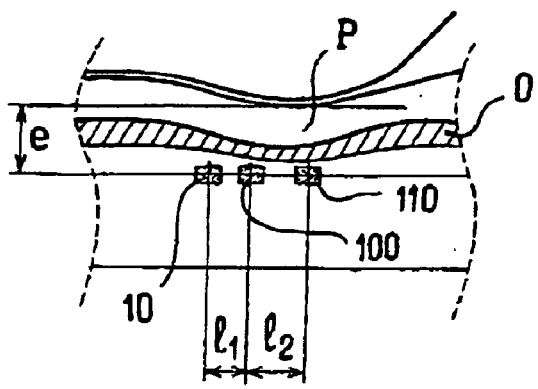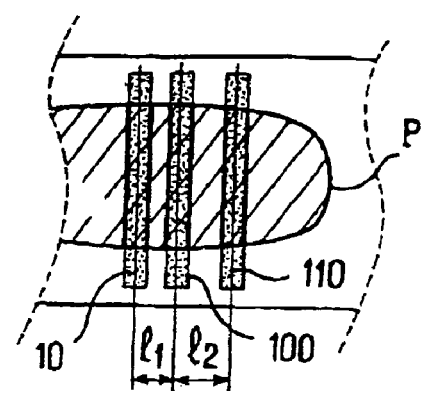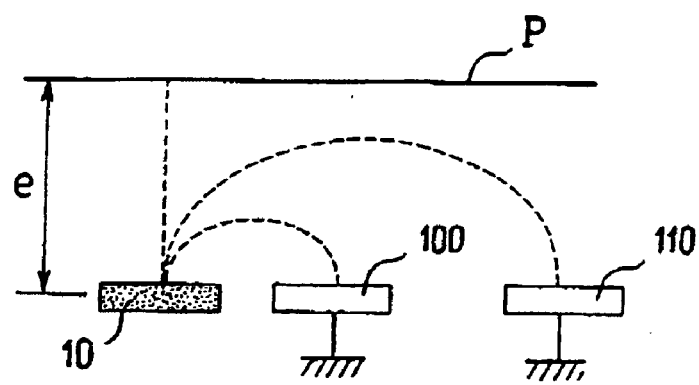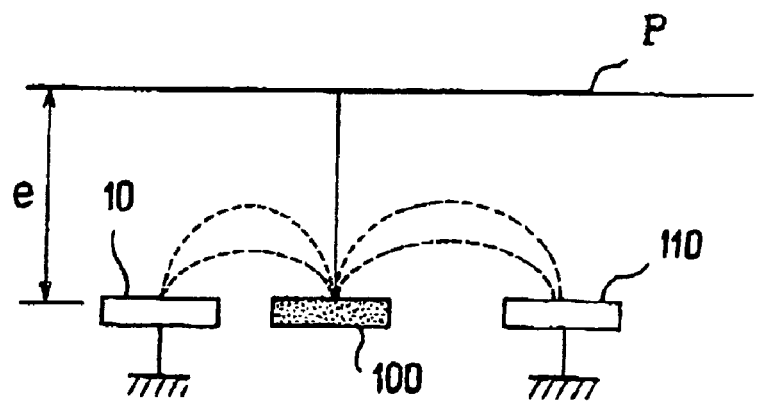

CAPACITIVE MEASURING SYSTEM

BACKGROUND OF THE INVENTION

The present invention relates to the field of sensors.

FIELD OF THE INVENTION

More precisely, the present invention relates to a measuring device that makes use of an indirect measurement of the permittivity between two electrically conducting bodies forming a measurement probe and a reference element, for example a reference probe, respectively.

DESCRIPTION OF THE RELATED ACT

Document WO-0025098 discloses a device whose basic structure is shown schematically in the appended FIG. 1.

This device comprises two electrically conducting bodies, constituting a measurement probe 10 and a reference probe 20 respectively, power supply means 30 capable of delivering a DC voltage of controlled amplitude, an integrating stage 50 that includes a capacitor switching system 53, and control means 40 suitable for cyclically defining, at a controlled frequency, a series of two sequences:

- a first sequence T1 during which the power supply means 30 are connected to the measurement probe 10 in order to apply an electric field between the measurement probe 10 and the reference probe 20 and to accumulate electric charges on the measurement probe 10; and then
- a second sequence T2, during which the power supply means 30 are disconnected from the measurement probe 10 and the latter is connected to a summing point of the integrating stage 50 in order to transfer charges into the integrating stage 50 and obtain, as output by the latter, a signal representative of the permittivity that exists between the measurement probe 10 and the reference probe 20.

More precisely still, according to document WO-0025098, the integrating stage 50 comprises an operational amplifier 51, a first integrating capacitor 52 mounted in a feedback loop onto this amplifier 51 and a second capacitor 53 switched between the output and the input of the operational amplifier 51 at the rate of the sequences controlled by the control means 40, in such a way that, in the steady equilibrium state, the operational amplifier 51 delivers, as output, an equilibrium voltage of E.Cs/C53, in which relationship −E denotes the amplitude of the voltage at the terminals of the power supply means 30 and Cs and C53 denote the values of the capacitances defined, on the one hand, between the measurement probe 10 and the reference probe 20 and, on the other hand, the switched second capacitor 53, respectively.

The power supply means 30 and the second capacitor 53 are switched by change-over switches 42, 43 controlled by a time base 41.

The operation of this known device is essentially the following.

Let us suppose that initially the integrating capacitor C52, the switching capacitor C53 and the capacitor Cs that is formed between the measurement probe 10 and the reference probe 20 are each completely discharged, i.e.:

QC52=0;
QC53=0; and
QCs=0.

During the first sequence T1, the capacitor Cs is charged to the supply voltage delivered by the module 30, which is assumed here to be equal to −E.

Therefore, at the end of the sequence T1:

QCs=−E.Cs;
QC52=0;
QC53=0.

During the next sequence T2, the charges are transferred from Cs to C52; i.e. the charges being conserved and Cs and C53 both being connected to the inverting input of the operational amplifier 51 of zero virtual impedance:

−E.Cs=Vs2.C52,

Vs2 being the output voltage of the operational amplifier 51 during the sequence T2.

During the next sequence T1, the two capacitors C52 and C53 are placed in series. Thus:

$Vs=Vs2.C52/(C52+53)=QC53/C53=QC52/C52$, i.e. QC53=[Vs2.C52/(C52+C53)].C53
    =[Vs2/(1+C53/C52).C53
i.e., if C52=nC53>>C53,
    QC53≈Vs2.C53.

At the next sequence T2, the charges contained in C53 are in opposition with those Cs. The remaining part of the charges of Cs is transferred into C52, etc.

The output voltage Vs, output by the operational amplifier 51, progressively increases until reaching a voltage:

$VS_{equilibrium}=QC53/C53$, such that QC53=$Vs_{equilibrium}$.C53=−E.Cs.

Thus, after x iterations, the device reaches an equilibrium state at the summing point. The charges QC53 and C53 compensate for the charges on the probe Cs.

As soon as a change in capacitance Cs is detected, the increase (or decrease) of charges on Cs will charge (or discharge) the capacitor C52.

Thus, in the steady state, the switching capacitor C53 will balance the variations in charges on the probe Cs.

BRIEF SUMMARY OF THE INVENTION

The object of the present invention is now to propose a novel device that again adopts the concept described in document WO-0025098, but whose performance is superior to that of the known prior devices.

More precisely still, the object of the present invention is to propose novel means for better identifying the environment of the measurement probe, in order to improve the detection of a transient phenomenon, for example to eliminate the effect of a permanent obstacle inserted between the measurement probe and the region in which a transient phenomenon occurs.

In this context, the present invention is especially, but not exclusively, applicable in the detection of a person or of an object on a motor vehicle seat.

This object is achieved within the context of the present invention by a device comprising at least one main measurement probe, means capable of sequentially applying a controlled supply voltage between the main measurement probe and a reference element and means capable of integrating the electrical charges accumulated on the main measurement probe, characterized in that it furthermore includes at least one auxiliary measurement probe connected, also sequentially, to controlled power supply means and to charge integration means, said auxiliary measurement probe having, with respect to a potential detection region, a different capacitance from the main measurement probe, in such a way that it is possible, by comparing the signals emanating from the two measurement probes respectively, to determine the influence of the main measurement probe.

According to a first embodiment of the present invention, the auxiliary measurement probe has a controlled area that is small compared to the main measurement probe.

According to a second embodiment of the present invention, the auxiliary measurement probe is located at a different distance from the potential detection region than the main measurement probe.

According to a third embodiment of the present invention, the auxiliary measurement probe lies in the same plane, at a different distance from the reference element, as the main measurement probe.

BRIEF DESCRIPTION OF THE DRAWINGS

Other features, objects and advantages of the present invention will become apparent on reading the detailed description that follows, in conjunction with the appended drawings given by way of non-limiting examples in which:

FIG. 1, described previously, shows schematically a device according to the prior art disclosed in document WO-0025098;

FIG. 2 shows schematically the detection of a passenger on a vehicle seat, using measurement probes according to the document WO-0025098;

FIG. 3 shows schematically the same device in the case of an obstacle inserted between the measurement probes and the detected body;

FIG. 4 shows schematically, in a plan view, a main measurement probe and an auxiliary measurement probe in accordance with a first embodiment of the present invention;

FIG. 5 shows the same main and auxiliary measurement probes according to a first embodiment of the present invention, in the case of the detection of a body having a different area from that of FIG. 4;

FIG. 6 shows schematically, in a sectional view, a main measurement probe and an auxiliary measurement probe in accordance with a second embodiment of the present invention;

FIGS. 7 and 8 show schematically, in a sectional view and a plan view respectively, a main measurement probe and an auxiliary measurement probe in accordance with a third embodiment of the present invention;

FIGS. 9 and 10 show schematically an example of a power supply for the measurement probes illustrated in FIGS. 7 and 8 and of the resulting detection;

DETAILED DESCRIPTION OF THE INVENTION

For the sake of simplification, the detailed description that follows will be given with reference to the detection of a person on a motor vehicle seat.

However, the present invention is not limited to this particular application.

FIG. 2 shows schematically two measurement probes 10 incorporated into the seat cushion 90 of a motor vehicle seat for the possible detection of a person P.

As described in document WO-0025098, the person P can be detected by sequentially applying a controlled electrical voltage between the measurement probes 10 and a reference element, such as the chassis of the motor vehicle, and then by integrating the electric charges thus accumulated on the measurement probes 10.

As a variant, the two probes labeled 10 in FIG. 2 may serve in the case of one of them as measurement probe and in the case of the other as reference element.

FIG. 3 shows schematically the same measurement probes 10 for the detection of the same person P, but in the case in which an obstacle 0, such as a bead seat cover or a towel, is inserted between the seat cushion, and therefore the probes 10, and the person P.

A person skilled in the art will understand that such an obstacle increases the distance between the probes 10 and the person P (this distance goes from e1 to e2) and consequently reduces the output signal from the detection device defined in document WO-0025098.

Without taking any particular precaution, there is therefore a risk of such an obstacle O falsifying the detection, likening the person P to a smaller mass than that of FIG. 2.

As indicated above, the object of the present invention is to propose means for eliminating this difficulty.

Figure 1A:
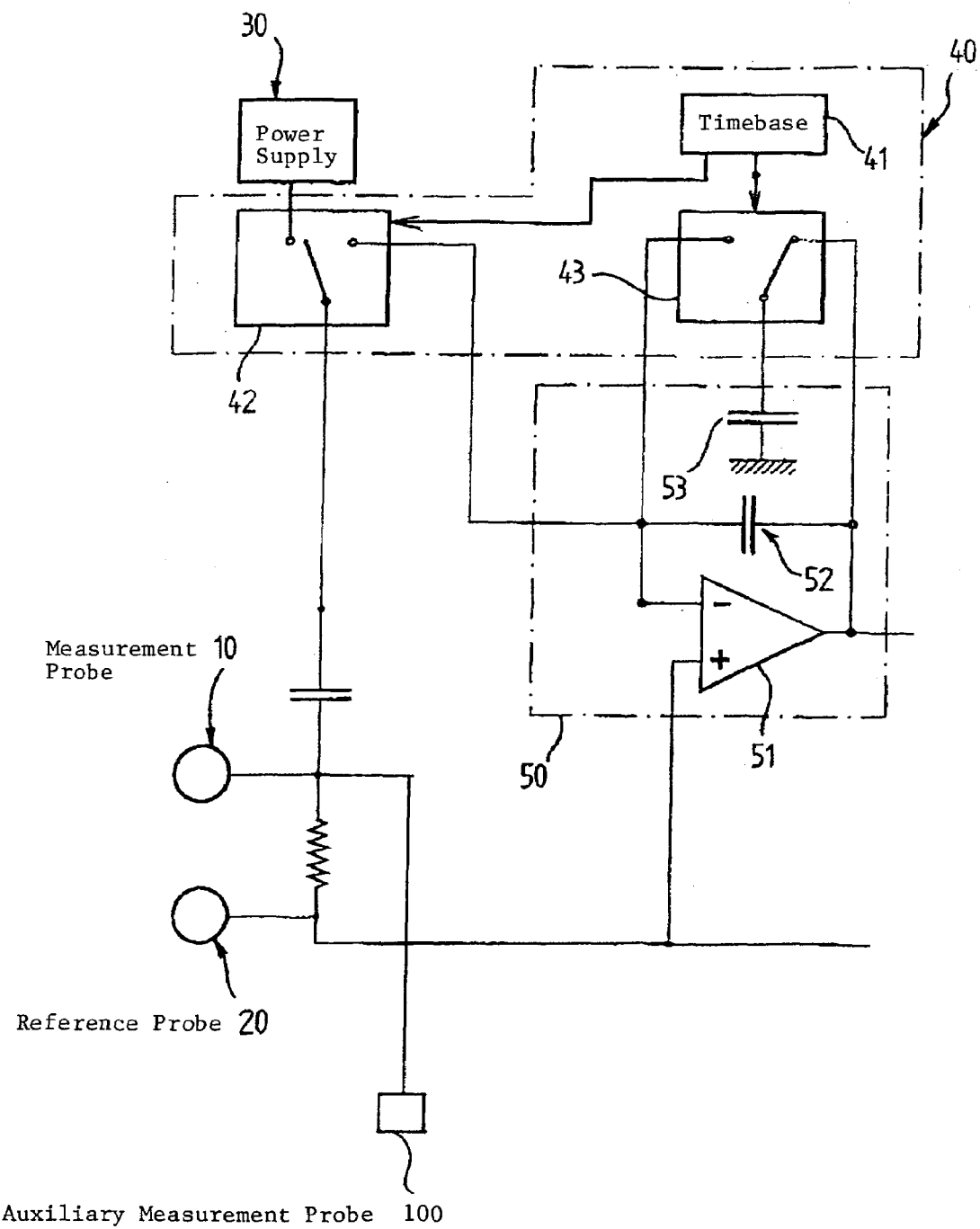
FIG. 1a shows schematically. a device according to the first embodiment of the present invention.

According to a first embodiment shown schematically in FIGS. 1a, 4 and 5, the present invention provides an auxiliary measurement probe 100 having a markedly smaller area than that of the main measurement probe in FIG 1a, the remaining elements shown are described above with reference to FIG. 1.

According to the representation given in FIGS. 4 and 5, the auxiliary measurement probe has a square outline. However, the invention is not limited to this particular arrangement. The auxiliary measurement probe 100 may have any other suitable geometry such as, for example, a circular outline.

The auxiliary measurement probe 100 is located at the same distance from the potential detection region, for example the upper surface of a seat, as the main measurement probe 10.

The area and the location of the auxiliary measurement probe 100 are such that the latter always experiences the same external influence during the occurrence of a transient external phenomenon, irrespective of the magnitude of this phenomenon.

For example in the case of the detection of a person P, the area and the location of the auxiliary measurement probe 100 are such that the latter always lies entirely beneath the person P when he is sitting on the seat.

On the other hand, the area and the location of the main measurement probe 10 are such that the area of this main measurement probe 10, influenced by the transient external phenomenon, depends on the magnitude of this phenomenon, for example it depends on the corpulence of the person P in the case of the detection of a person on a motor vehicle seat.

As a non-limiting example, the auxiliary measurement probe 100 may be centered on the detection region and have a larger transverse dimension, of around a few centimeters, for example less than 3 cm and preferably less than 1 cm, and a total area of less than a few square centimeters, for example less than 9 cm$^2$ and preferably less than 4 cm$^2$.

In contrast, the main measurement probe 10 preferably has at least one dimension greater than the largest possible dimension of the body P that can be detected.

The main measurement probe 10 may have any geometry, such as for example a sinusoidal or rectangular geometry. In the latter case, an area of around a few cm by several dm, for example around a few cm, such as around 5 cm, by more than 30 cm, preferably more than 40 cm, is developed.

The use of the auxiliary electrode illustrated in FIGS. 4 and 5 allows the measurement to be normalized with respect to the distance from the body P.

This is because the signal resulting from the integration of the charges accumulated on the auxiliary measurement probe 100 can be used to determine the distance separating the body P from the auxiliary measurement probe 100, since the size of the body P has no influence on this measurement.

On the other hand, the signal resulting from the integration of the charges accumulated on the main measurement probe 10, normalized by the result coming from the auxiliary measurement probe 100, can be used for directly obtaining reliable information representative of the size of the body P.

According to a second embodiment shown schematically in FIG. 6, the present invention provides an auxiliary measurement probe 100 located at a different distance from the potential detection region, for example the upper surface of a seat cushion, than the main measurement probe 10, but preferably having an area identical to that of the main measurement probe. The auxiliary measurement probe 100 is also close to the main measurement probe 10.

The difference in distance between the two probes 100 and 10, relative to the body to be detected, must be constant.

Thus, the difference in influence of the body P on the two respective probes 10 and 100 depends only on the difference in distance between the body P and these probes 10 and 100. Let:

S1 be the area of the main measurement probe 10;
S2 be the area of the auxiliary measurement probe 100;
e be the distance separating the measurement probe 10 from the body P; and
a be the additional distance separating the main measurement probe 10 and the auxiliary measurement probe 100 from the body P;
then the following are obtained:
a capacitance C1=K(S1/e) on the main measurement probe 10; and
a capacitance C2=K[S2/(e+a)] on the auxiliary measurement probe 100.

The combination of the above two expressions therefore makes it possible to determine the distance e and subsequently to factor out this distance in the measurement.

Of course, a similar detection may be performed with measurement probes 10 and 100 having any geometry and areas S1 and S2 that are different, but in a known ratio, which are positioned at a relative distance a that is also known.

As indicated above in the case of FIGS. 4 and 5, the main measurement probe 10 preferably has at least one dimension greater than the largest possible dimension of the body P that can be detected. The main measurement probe 10 may also be in accordance with the provisions described above with regard to FIGS. 4 and 5.

According to a third embodiment shown schematically in FIGS. 7 to 10, the present invention provides a main measurement probe 10 and an auxiliary measurement probe 100 that is placed at a different distance (unsymmetrical probes) from a reference element 110.

Thus, according to the active measurement probe, 10 or 100, the distribution of the electrical field varies (see especially FIGS. 9 and 10) and therefore the influence of the body P to be detected on this same probe varies according to the distance.

The distance e that separates the body P to be detected from the measurement probes 10 and 100 can therefore be determined by the combined use of the signals emanating from these two measurement probes 10 and 100, for example by a ratio of the two capacitances C1 and C2 measured on these two probes.

By way of non-limiting example, as illustrated in FIGS. 7 and 8, the two, main 10 and auxiliary 100, measurement probes may be coplanar with the reference element 110. According to the non-limiting representation given in FIGS. 7 to 10, the auxiliary probe 100 is located between the measurement probe 10 and the reference element 110. Typically, the center-to-center distance l1 between the two measurement probes 10 and 100 is around a few millimeters and the center-to-center distance l2 between the auxiliary probe 100 and the reference element 110 is around a few centimeters, but at least twice l1.

The main measurement probe 10 and auxiliary measurement probe 100 preferably have identical areas, but they may have any geometry, for example a rectangular geometry. The reference element 110 may also have an area identical to the main 10 and auxiliary 100 measurement probes. However, as a variant, the main 10 and auxiliary 100 measurement probes may have areas that differ in a known ratio.

Here again, the main measurement probe 10 at least preferably has at least one dimension greater than the largest possible dimension of the body P that can be detected.

As shown schematically in FIGS. 9 and 10, when one of the two probes, 10 or 100, is active, the other probe, 100 or 10, may itself serve as auxiliary reference element.

It should be noted that, for the purpose of the present invention, the main 10 and auxiliary 100 measurement probes are each sequentially connected to a power supply of known amplitude and then the electric charges accumulated on these probes are integrated, preferably using means similar to those defined in document WO-0025098 (and described with regard to FIG. 1). The power supply means and the charge integration means may be the same for different probes, 10 and 100. In this case, switching/multiplexing means alternately switch the probes 10 and 100 to the terminals of these means. As a variant, it is possible to provide different power supply means and different charge integration means for the various probes 10 and 100.

For the purpose of the present invention, the reference element may be formed from a reference probe or else from a ground formed for example by the neighboring metal ground or earth, for example the chassis of a motor vehicle.

A person skilled in the art will understand that the various embodiments according to the present invention, described above, allow two mutually independent measurements to be made, under the same conditions, of the same transient phenomenon and therefore make it possible to decouple the two phenomena from influences formed by the area and the distance of the body P to be detected.

Of course, the present invention is not limited to particular embodiments that have just been described, but rather it extends to any variant in accordance with its spirit.

The present invention may have a large number of applications. Mentioned previously was the detection of someone using a motor vehicle seat, especially for actuating a safety airbag system. However, the present invention is not limited to that particular application. For example, the present invention may also relate, inter alia, to the fields of anti-intrusion detection or else fluid level detectors.

The alternative embodiment according to the present invention illustrated in the appended FIGS. 11 to 13 will now be described.

These figures again show the three probes, labeled 10, 100 and 110 respectively.

The functions of these three probes 10, 100 and 110 may vary depending on the configuration in which they are used.

In principle, the probe 110 serves as reference probe. In this context, the probe 10 constitutes the main measurement probe while the probe 100 constitutes the auxiliary measurement probe.

However, during another operating phase according to the present invention, the probe 10 may constitute the main measurement probe, while the probe 100 serves as reference probe.

Figure 11:
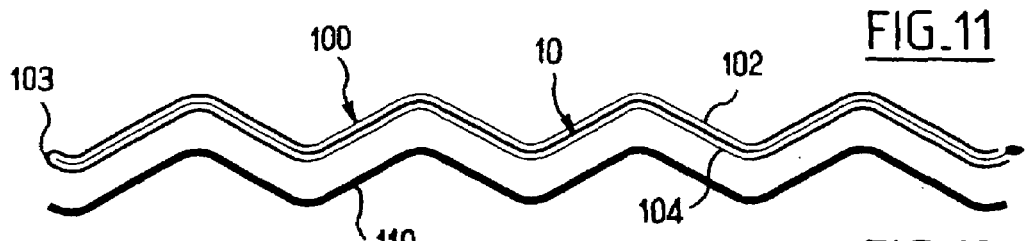
FIG. 11 shows a plan view of the probes according to another embodiment of the present invention.
Figure 12:
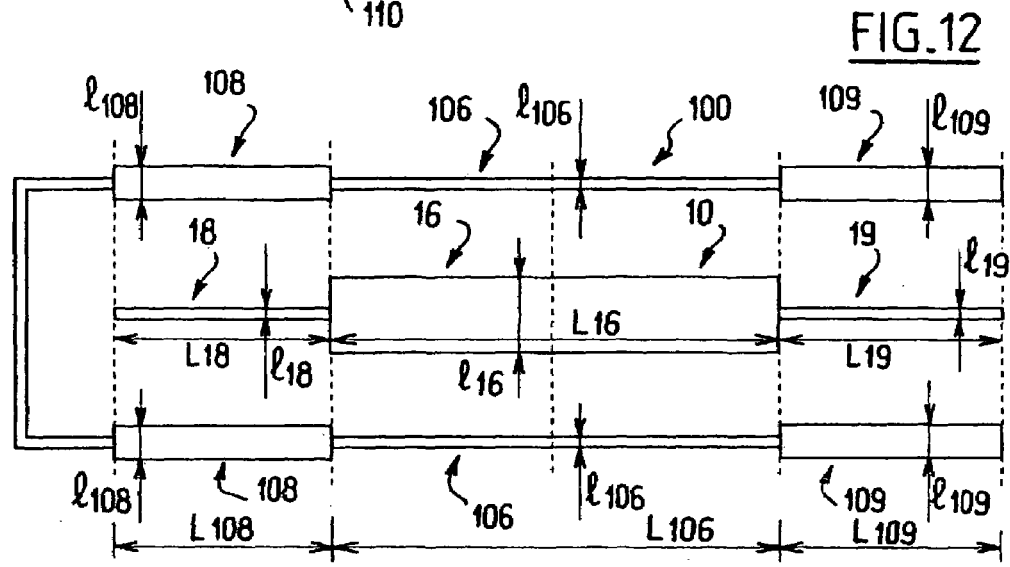
FIG. 12 shows a plan view with the scale enlarged in the transverse direction and compressed in the longitudinal direction of the same probes.
Figure 13:
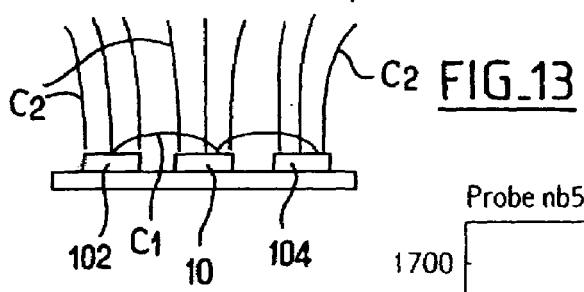
FIG. 13 shows a cross-sectional view of the same probes and illustrates more precisely the field lines according to one particular embodiment.

According to the embodiment shown in FIGS. 11 to 13, each probe 10, 100 and 110 is elongate. Its length L is typically greater than 10 times its width, very preferably its length L is typically greater than 20 times its width.

According to a notable first feature of the embodiment shown in FIGS. 11 to 13, the probe 100 has a U-shaped configuration. Thus, the probe 100 has two mutually parallel main strands 102, 104, placed respectively on either side of the probe 10. In other words, the probe 100 surrounds the probe 10. For this purpose, the two strands 102, 104, at one of their ends, are joined together by a linking element 103.

The Applicant has determined that, owing to the aforementioned features, the electrode 10 is very insensitive to the edge effects of the electric field and gives signal information only when the passenger is very close to the probe. In contrast, the electrode 100 is very sensitive to the edge effects of the electric field and gives signal information even when the passenger is very far from the probe (for example, typically up to around twenty centimeters from the probe).

According to an important second feature of the embodiment shown in FIGS. 11 to 13, the probe 10 and the probe 100 have widths that vary along their length.

More precisely still, each of the probes 10 and 100 preferably has three portions, namely a central portion 16, 106 and two end portions 18, 19; 108, 109.

Preferably, the end portions 18, 19 on the one hand, and 108, 109 on the other, have identical widths for a given probe 100 or 200.

More precisely still, the probe 100 preferably has a central portion 16 of length L16 and of large width l16 and two end portions 18, 19 of length L18 and L19 and of small width l18, l19 smaller than l16.

Typically, but not limitingly, l16=4l18=4l19.

Also typically, L16=2L18=2L19.

Preferably, the probe 100 has a central portion 106 of length L106 and of small width l106 and two end portions 108, 109 of length L108, L109 and of large width l108, l109 greater than l106.

Typically, l108=l109=2l106=2l18=2l19.

Typically, L106=2L108=2L109.

Owing to the geometric characteristics that have just been mentioned, when a voltage is applied alternately or simultaneously between the probes 10 and 110 on the one hand, and 100 and 110 on the other, the probe 10 is very sensitive to a centered external element, that is to say one placed opposite the central portion 16, whereas the probe 100 is very sensitive to an off-centered element, that is to say one placed opposite the end portions 108, 109.

According to a third significant feature of the invention, illustrated in FIGS. 11 to 13, each probe 10, 100 and 110 is nonrectilinear. In this case, each probe 10, 100, 110 is formed from various segments, that are individually rectilinear, but joined in pairs via their ends by transition elements formed from dihedra whose concavities alternate, that is to say the concavities are directed alternately in one direction and then in the other. Thus, the probes 10, 100 and 110 are in the form of zig-zagged corrugations.

Such a geometry permits extension by deformation of the support.

This feature is particularly important when the probes 10, 100 and 110 are incorporated in a vehicle seat. This is because this geometry permits extention of the probes when a driver or passenger sits on the seat.

It should also be noted that the distance separating the probe 110 from the probe 10 or from the probe 100 is preferably greater than the distance that separates the probes 10 and 100 from each other.

Furthermore, the supply voltage application means are suitable for sequentially applying a voltage between the terminals 10 and 100 in one operating phase and between the probe 110 and each of the two probes 10 and 100 during another operating phase.

In FIG. 13, the field lines obtained when a voltage is applied between the probes 10 and 100 are labeled C1, whereas the field lines obtained when a voltage is applied between the probe 110 and each of the two probes 10 and 100 are labeled C2.

On examining FIG. 13 it may be seen, when a voltage is applied between the probes 10 and 100, the range of detection is greatly reduced because the field lines C1 are highly curved.

In contrast, when the voltage is applied between the probe 110 and each of the probes 10 and 100, the detection range is much larger since the field lines C2 are approximately orthogonal to the supports of the probes.

By way of nonlimiting example, the probe 110 may be placed approximately 2 cm from the probes 10 and 100.

As indicated above, for the purpose of the present invention, the signals emanating from the respective various probes are used in a comparative manner.

Within the context of the embodiment shown in FIGS. 11 to 13, the signals obtained on the probes 10 and 100, and the signals obtained by summing on the two probes 10 and 100, may thus be compared with the signal from the probe 10 or with the signal from the probe 100, etc.

A person skilled in the art will understand that the present invention thus provides a large number of comparison choices.

Even more precisely, but non-limitingly, the present invention may, for example, make use of one of the following ratios:

U/C, U representing the signal taken off the probe 100 when a supply voltage is applied between, on the one hand, the probes 10 and 110 joined together and serving as reference probe and, on the other hand, the probe 100, while C represents the signal taken off the probe 10 when a supply voltage is applied between, on the one hand, the probes 100 and 110 joined together and serving as reference probe and, on the other hand, the probe 10;

UC/C, UC representing the signal taken off the probe 100 when a supply voltage is applied between the probe 110 and simultaneously the probes 10 and 100;

UC/U;

CU/U, CU representing the signal taken off the probe 10 when a supply voltage is applied between the probe 110 and simultaneously the probes 10 and 100;

CU/U.

Figure 14:
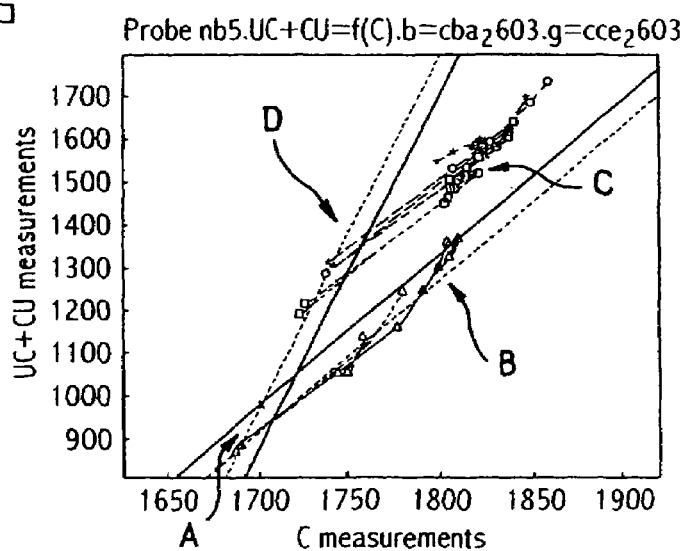
FIG. 14 illustrates a graph of the results obtained using the probes illustrated in FIGS. 11 to 13, which graph makes it possible to discriminate between various detection configurations.

By way of non-limiting example, by comparing the sum of the signals UC+CU defined above with the signal C defined above, which corresponds to the graph illustrated in FIG. 14, it is possible to ditinguish four regions:

region A, which corresponds to the absence of an external influence element, for example an empty seat;

region B, which corresponds to an environment without a wet obstacle, for example a seat occupied without a wet obstacle;

region C, which corresponds to an environment occupied with a wet obstacle, for example a seat occupied with a wet obstacle; and region D of an environment remotely occupied, for example a seat occupied with a passenger away from the seat.

Of course, the present invention is not limited to this particular method of operation but extends to any variant in accordance with its spirit.

The invention claimed is:

1. A measuring device comprising:
at least one measurement probe (10),
means (30) for sequentially applying a controlled supply voltage between the measurement probe (10) and a reference element (20);
means (50) for integrating the electrical charges accumulated on the measurement probe (10),
at least one auxiliary measurement probe (100) connected, also sequentially, to controlled power supply means (30) and to charge integration means (50), said auxiliary measurement probe (100) having, with respect to a potential detection region, a different capacitance from the main measurement probe (10), in such a way that it is possible, by comparing the signals emanating from the two measurement probes (10, 100) respectively, to determine the influence of the main measurement probe.

2. The device as claimed in claim 1, wherein the auxiliary measurement probe (100) has a controlled area that is small compared to the main measurement probe (10).

3. The device as claimed in claim 2, wherein the auxiliary measurement probe (100) lies at the same distance from the potential detection region, for example the upper surface of a seat, as the main measurement probe (10).

4. The device as claimed in claim 2 or claim 3, wherein the area and the location of the auxiliary measurement probe (100) are such that the latter always experiences the same external influence when a transient external phenomenon occurs, irrespective of the magnitude of this phenomenon.

5. The device as claimed in claim 2, wherein the area and the location of the main measurement probe (10) are such that the area of this main measurement probe (10) influenced by the transient external phenomenon depends on the magnitude of this phenomenon.

6. The device as claimed in claim 2, wherein the auxiliary measurement probe (100) is centered on the detection region.

7. The device as claimed in claim 2, wherein the auxiliary measurement probe (100) has a larger transverse dimension, of around a few centimeters.

8. The device as claimed in claim 7, wherein the transverse dimension is less than 1 cm.

9. The device as claimed in claim 2, wherein the auxiliary measurement probe (100) has a total area of less than a few square centimeters.

10. The device as claimed in claim 9, wherein the total area is less than 4 cm$^2$.

11. The device as claimed in claim 2, wherein the measuring device includes means for using the signal emanating from the integration of the charges accumulated on the auxiliary measurement probe (100) to determine the distance separating a body (P) from the auxiliary measurement probe (100) and then consequently to normalize the measurement obtained from the main probe (10).

12. The device as claimed in claim 1, wherein the auxiliary measurement probe (100) is located at a different distance from the potential detection region than the main measurement probe (10).

13. The device as claimed in claim 12, wherein the auxiliary measurement probe (100) has an area identical to that of the main measurement probe (10).

14. The device as claimed in claim 12, wherein the auxiliary measurement probe (100) has a different area from that of the main measurement probe (10), but in a known ratio relative to the latter.

15. The device as claimed in claim 12, 13 or 14, wherein the auxiliary measurement probe (100) is close to the main measurement probe (10), so that the difference in influence of an external body (P) on the respective two probes (10, 100) depends only on the difference in distance between the body (P) and these probes (10, 100).

16. The device as claimed in claim 12, wherein the measuring device includes means for combining the signals detected on the two measurement probes (10, 100) in order to determine the distance (e) between the main probe (10) and a body (P) to be detected and subsequently to factor out said distance in the measurement.

17. The device as claimed in claim 1, wherein the auxiliary measurement probe (100) and the main measurement probe (10) are asymmetric with respect to a reference element (110).

18. The device as claimed in claim 17, wherein the auxiliary measurement probe (100) is located at a different distance from a reference element (110) than the main measurement probe (10).

19. The device as claimed in claim 17 or claim 18, wherein it includes means for determining the distance (e) separating a body (F) to be detected from the measurement probes (10, 100) by combined use of the signals emanating from these two measurement probes (10, 100), for example by a ratio of the two capacitances measured on these two probes.

20. The device as claimed in claim 17, wherein the two, main (10) and auxiliary (100), measurement probes are coplanar with the reference element (110).

21. The device as claimed in claim 17, wherein the main (10) and auxiliary (100) measurement probes have identical, for example rectangular, areas.

22. The device as claimed in claim 17, wherein the reference element (110) has an area identical to the main (10) and auxiliary (100) measurement probes.

23. The device as claimed in claim 17, wherein the main (10) and auxiliary (100) measurement probes have different areas in a known ratio.

24. The device as claimed in claim 17, wherein when one of the two measurement probes (10, 100) is active, the other measurement probe (100, 10) itself serves as auxiliary reference element.

25. The device as claimed in claim 1, wherein the main measurement probe (10) has at least one dimension greater than the largest possible dimension of the body (P) that can be detected.

26. The device as claimed in claim 1, further comprising:
a probe (100) of U shaped configuration comprising two mutually parallel main strands (100, 204) placed respectively on either side of another probe (10).

27. The device as claimed in claim 1, further comprising:
at least one probe (10, 100) having a width that varies along its length.

28. The device as claimed in claim 27, further comprising:
at least one probe (10, 100) having three portions, namely a central portion (16, 106) and two end portions (18, 19; 108, 109).

29. The device as claimed in claim 27, further comprising:
at least one probe (10) having a central portion (16) of large width (116) and two end portions (18, 19) of small width (118, 119).

30. The device as claimed in claim 27, further comprising:
at least one probe (100) having a central portion (106) of small width (1106) and two end portions (108, 109) of large width (1108, 1109).

31. The device as claimed in claim 1, further comprising:
at least one nonrectilinear probe (10, 100, 110).

32. The device as claimed in claim 31, further comprising:
at least one probe (10, 100, 110) formed from various rectilinear segments joined together in pairs via their ends by transition elements of the concave dihedron type with alternating concavities.

33. The device as claimed in claim 1, further comprising:
a first set of two probes (10, 100) that are located at a defined distance from each other and a third probe (110) located at a greater distance from the two first mentioned probes (10, 100) than the gap that exists between said two probes.

34. The device as claimed in claim 23, further comprising:
means for sequentially applying a voltage between, on the one hand, the two first mentioned probes (10, 100) and, on the other hand, between the third probe (110) and each of the two first mentioned probes (10, 100), respectively.

* * * * *

UNITED STATES PATENT AND TRADEMARK OFFICE
CERTIFICATE OF CORRECTION

| | |
|---|---|
| PATENT NO. | : 7,098,673 B2 |
| APPLICATION NO. | : 10/482611 |
| DATED | : August 29, 2006 |
| INVENTOR(S) | : Launay et al. |

Page 1 of 1

It is certified that error appears in the above-identified patent and that said Letters Patent is hereby corrected as shown below:

On the Title Page, Item [75], please delete "Pancirol" and insert -- Panciroli --.

Signed and Sealed this

Seventh Day of August, 2007

JON W. DUDAS
*Director of the United States Patent and Trademark Office*